June 28, 1949.　　　M. E. HIEHLE　　　2,474,580
VOLTAGE REGULATING SYSTEM
Filed May 23, 1946

Inventor:
Michael E. Hiehle,
by 
His Attorney.

Patented June 28, 1949

2,474,580

UNITED STATES PATENT OFFICE 2,474,580

VOLTAGE REGULATING SYSTEM

Michael E. Hiehle, Syracuse, N. Y., assignor to General Electric Company, a corporation of New York Application May 23, 1946, Serial No. 671,677

6 Claims. (Cl. 250—36)

This invention relates to control circuits and more particularly to the control of the unidirectional output voltage of a voltage multiplying type rectifier in accordance with a load condition.

It is an object of this invention to provide improved means to control the unidirectional output voltage of a voltage multiplying rectifier in accordance with a load condition.

It is a further object of this invention to provide means to control the unidirectional output voltage of a rectifier, which means are suitable for application to a voltage doubler type rectifier.

Another object of this invention is to provide improved means to maintain constant the frequency of a reflex type oscillator by varying the unidirectional voltage applied to the reflector electrode in accordance with the frequency of oscillation.

Still another object of this invention is to provide a voltage controlling rectifier which requires only standard equipments, has a high degree of simplicity and reliability and has a high value of output voltage as compared with applied alternating voltage.

Another object of this invention is to provide a voltage controlling rectifier suitable for use as a source of voltage for the reflector electrode of a reflex type oscillator and which inherently prevents that electrode from becoming substantially positive relative to the cathode and which may be combined with rectifiers supplying other electrode voltages.

Yet another object of this invention is to provide a controlled source of high unidirectional voltage of value determined by a small voltage having a relatively low potential with respect to ground.

The novel features which I believe to be characteristic of my invention are set forth with particularity in the appended claims. The invention itself however both as to its organization and method of operation, together with further objects and advantages thereof, may best be understood by reference to the following disclosure taken in connection with the accompanying drawing in which Fig. 1 shows the circuit diagram of one embodiment thereof and Fig. 2 shows a modification of this embodiment.

Figure 1:
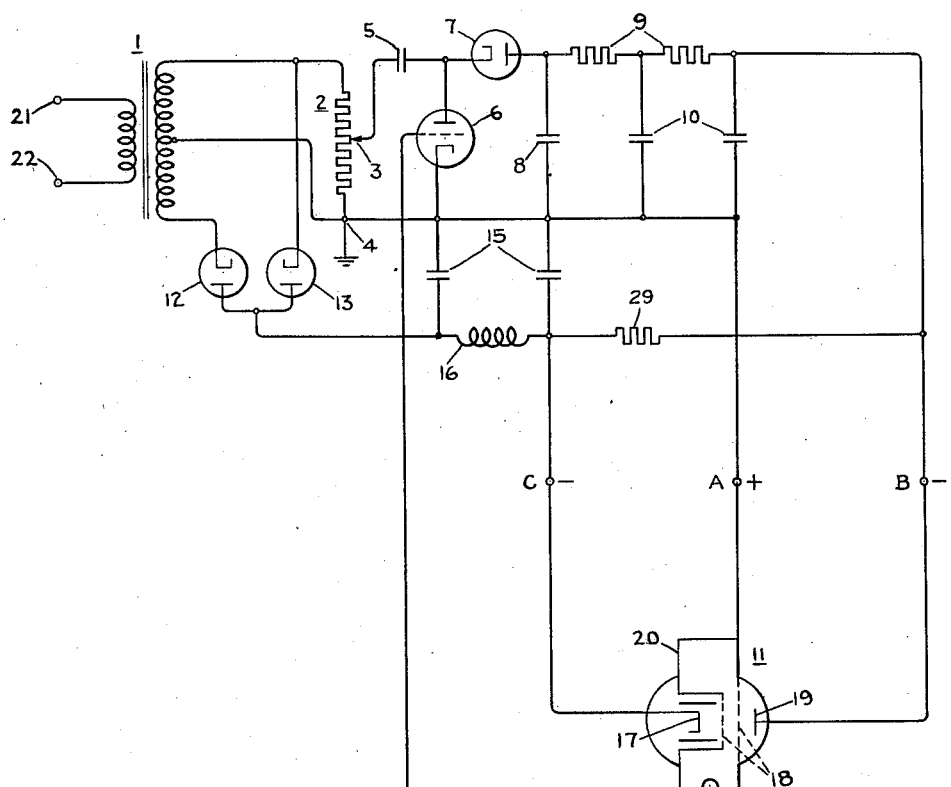
Figure 2:
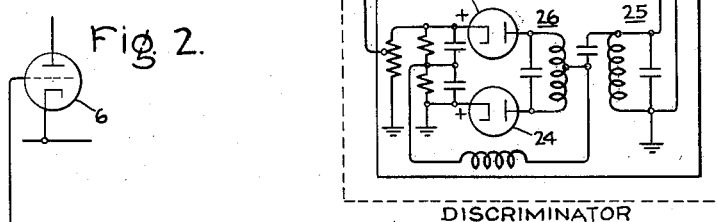
Figure 2:
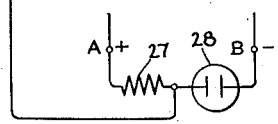

In the embodiment of my invention shown in Fig. 1, a power transformer, generally shown at 1, supplies alternating voltage across potentiometer 2. The primary winding of this transformer is connected to terminals 21 and 22 which are in turn connected to a source of alternating voltage. A portion of the alternating voltage across potentiometer 2, taken between adjustable terminal 3 and ground terminal 4, is applied through condenser 5 to the anode of electron discharge device 6. In addition, electron discharge devices 7 and condenser 8 are connected across device 6, the cathode of device 7 being connected to the anode of device 6. The voltage across condenser 8 is passed through an RC filter comprising resistances 9 and condensers 10 to output terminals A and B.

In addition to the above described rectifying circuit, a full wave rectifier utilizing diode electron discharge devices 12 and 13 is connected across the secondary winding of transformer 1. A filter comprising condensers 15 and inductance 16 connects the output voltage of this rectifier to terminals C and A, terminal C having negative potential as compared with terminal A.

A reflex type microwave oscillator is shown generally at 11, this device including cathode 17, control electrodes 18, and reflector electrode 19. This device may, for example, comprise the local oscillator in a microwave superheterodyne type radio receiver. Control electrodes 18 are part of the opposite walls of cavity resonator 20. In this oscillator, cathode 17 is maintained at a negative potential relative to control electrodes 18 by reason of the negative potential on terminal C with respect to terminal A. A similar negative potential is maintained at reflector electrode 19 by reason of the negative potential on terminal B with respect to terminal A.

In a reflex type oscillator, such as that shown at 11, electrons are attracted from the cathode to the control electrodes and, after passing through electrodes 18, a portion of the electrons moving at the lower velocities are reversed in their direction of travel by the electric field in the vicinity of the reflector electrode 19 and reenter the resonant cavity, thereby exciting and sustaining oscillations in that cavity. The forces tending to reverse the electron motion depend on the negative potential of the reflector electrode. Inasmuch as the time required for such reversal and the distance toward the anode 17 that the electrons travel depends on this force, the frequency of oscillation of oscillator 11 is a function of the negative voltage at reflector electrode 19 as well as the natural resonant frequency of the cavity. Accordingly, the frequency of oscillator 11 may be maintained constant by varying the voltage of reflector electrode 19 to compensate for frequency disturbances.

The circuit including devices 6 and 7 acts as a conventional voltage doubler. Device 6 conducts when its anode becomes positive with respect to the cathode, thereby charging condenser 5 during one-half of the voltage wave appearing across potentiometer 2. This charge on condenser 5 causes the electrode of this condenser next to the anode of device 6 to be negative with respect to the opposite electrode, the amount of this voltage being determined by the effective resistance of device 6 during the charging period. On the other half of the voltage wave across potentiometer 2, terminal 3 becomes negative with respect to ground terminal 4. This causes condenser 8 to charge through device 7, the voltage reached by condenser 8 depending on the effective resistance of device 7, the charge on capacitor 5, and voltage across potentiometer 2. This voltage may be made substantially twice the peak alternating voltage between terminals 3 and 4 by proper choice of condensers 5 and 8 and using devices 6 and 7 of types having low effective resistance while conducting. The pulsating voltage appearing across condenser 8 due to the successive charging periods is smoothed by the RC filter comprising resistances 9 and condensers 10, thereby applying to terminal B a relatively smooth unidirectional voltage of negative polarity with respect to terminal A.

Control of the voltage between terminals A and B is achieved by varying the relative potential between the cathode and control electrode of device 6. In a frequency stabilizing system, for instance, this control may be obtained from a frequency discriminator shown generally as 14. This discriminator is coupled to the radio frequency output circuit of device 11 and is designed to produce output voltage of magnitude dependent on the frequency of oscillations in that circuit. Hence, the relative potential of the control electrode and cathode of device 6 is made dependent on the operating frequency of device 11. By arranging discriminator 14 to provide increasing negative potential at the control electrode of device 6 as the frequency of device 11 increases above the desired value, the effective resistance of device 6 when charging condenser 5 is increased and the charge on that condenser accordingly reduced. The available voltage to charge condenser 8 through device 7 is thereby reduced and terminal B caused to have a smaller negative potential with respect to terminal A. This decreases the negative potential on the reflector of device 11, thereby decreasing the frequency of operation of that device and tending to prevent the initial frequency disturbance.

The particular circuit of frequency discriminator 14 constitutes no part of this invention and may be any one of the devices for this purpose well known in the art, the only requirement being that an increased negative voltage be produced between the control electrode of device 6 and ground as the frequency of oscillator 11 increases. In the particular circuit shown in Fig. 1, the output voltage is determined by the difference in the peak voltages applied to rectifiers 23 and 24. Resonant circuits shown generally at 25 and 26 are provided, the alternating voltage applied to rectifier 24 being equal to that across circuit 25 plus half that across circuit 26 and the alternating voltage applied to rectifier 23 being equal to that across circuit 25 minus half that across circuit 26. As circuits 25 and 26 are tuned to resonance at the frequency at which zero output voltage is desired, the voltages applied to the two rectifiers are identical at this frequency and no voltage is applied to the control electrode of device 6. At higher frequencies, the voltage across rectifier 23 decreases and the voltage across rectifier 24 increases, thereby providing an increased negative voltage for application to the control electrode of device 6. This results from the well known fact that the voltage across circuit 26 has a 90 degree phase displacement at the frequency of resonance whereas at other frequencies it has greater or less phase displacement in accordance with the frequency. If, for example, the frequency increases, the voltage across the lower half of circuit 26 approaches an aiding relation with the voltage across circuit 25 and the voltage across the upper half of circuit 26 approaches an opposing relation with the voltage across circuit 25, thereby increasing the voltage across diode 24 and decreasing the voltage across diode 23 and increasing the negative voltage between the cathode of diode 23 and ground.

It is the function of the full wave rectifier circuit including rectifiers 12 and 13, capacitors 15 and inductor 16 to provide a substantially constant negative voltage at cathode 17 with respect to control electrodes 18. It is a characteristic of reflex oscillators that the reflector electrode must not become positive with respect to the cathode by any significant voltage as otherwise overheating of the reflector will take place. This portion of the circuit, together with resistance 29, provides negative voltage at cathode 17 in a manner to prevent the possibility of reflector electrode 19 becoming appreciably positive with respect to cathode 18. In addition, rectifiers 12 and 13 provide a convenient source of cathode-control electrode voltage without requiring an additional winding on transformer 1.

It is the purpose of resistance 29 to assure that under all conditions of adjustment of potentiometer 2 the reflector electrode 19 of device 11 does not become positive with respect to cathode electrode 17, by any significant voltage. If the moving terminal of potentiometer 2 is adjusted so that the charge voltage at condenser 8 corresponding to rectification through device 7 is less than the charge voltage on condensers 15 due to rectification through devices 12 and 13, the cathode of device 7 becomes positive with respect to the anode at all points in the alternating voltage cycle and no charge takes place therethrough. This results from the fact that condenser 8 then charges through resistances 29 and 9 to substantially the voltage of condenser 15. The voltage of point B is then made substantially equal to the voltage of point C and further changes in the adjustment of potentiometer 2 have no effect on the potential of terminal B. The voltage divider action of resistance 29 and the leakage resistances of condensers 8 and 10 permit some positive potential at point B relative to point C, but this is made negligible by use of a relatively low value of resistance 29.

The control voltage at device 6 is at a low potential relative to ground even when the output potential across terminals A and B is very large. This permits use of small inexpensive low voltage components in discriminator 14 and provides a maximum degree of reliability and stability.

While my invention has thus far been shown and described in relation to frequency control of a velocity modulated oscillator, it will be evident that the principles thereof may be applied to other purposes. For instance, the voltage between the control electrode of device 6 and the cathode thereof is reproduced between the terminals A and B. Hence, the system operates as a direct current amplifier and may be used for this purpose. Similarly, if it is desired to maintain constant voltage across terminals A and B rather than constant frequency of oscillator 11, a voltage sensitive network may be substituted for discriminator 14, the voltage sensitive network causing the control electrode of device 6 to become more negative with respect to the cathode thereof when output voltage between terminals A and B tends to increase above the desired value. One network of this type is shown in Fig. 2, resistance 27 and gas discharge device 28 being connected in series across terminals A and B and their common terminal being connected to the control electrode of device 6. In this case any tendency for the voltage across these terminals to increase is counteracted by increased negative voltage applied to the control electrode of device 6 from the common terminal of resistance 27 and device 28.

While I have shown and described particular embodiments of my invention, it will be obvious to those skilled in the art that other changes and modifications may be made without departing from my invention in its broader aspects and I therefore aim in the appended claims to cover all such changes and modifications as fall within the true spirit and scope of my invention.

What I claim as new and desire to secure by Letters Patent of the United States, is:

1. A regulating circuit comprising in combination, a source of alternating electromotive force, a first condenser and a first rectifier connected in series relation across said source, a second rectifier and a second condenser connected in series relation across said first rectifier, one of said rectifiers including a control electrode, said second rectifier being disposed to conduct current from the point of connection of said rectifiers in a direction opposite to said first rectifier, a utilization device, said device having an operating condition which varies in accordance with an applied voltage, means connecting said device across said second condenser, thereby to supply said voltage to said device, means to produce an electromotive force varying in accordance with the deviation of said operating condition from a desired value, and means to impress said electromotive force on said control electrode thereby to vary the effective resistance of said one rectifier, said variation being in direction to compensate for said deviation, thereby tending to maintain constant said operating condition.

2. A regulating circuit comprising in combination, a source of alternating electromotive force, a first condenser and a first rectifier connected in series relation across said source, a second rectifier and a second condenser connected in series relation across said first rectifier, one of said rectifiers including a control electrode, said second rectifier being disposed to conduct current from the point of connection of said rectifiers in a direction opposite to said first rectifier, an oscillator, said oscillator having operating frequency varying in accordance with an applied voltage, means connecting said oscillator across said second condenser, thereby to supply said voltage to said oscillator, means to produce an electromotive force varying in accordance with the deviation of said operating frequency from a desired value, and means to impress said electromotive force on said control electrode thereby to vary the effective resistance of said one rectifier, said variation being of direction to compensate for said deviation, thereby tending to maintain constant said operating frequency.

3. In combination, a reflex oscillator having an electron discharge device with a cathode, a control electrode, and a reflector electrode, a source of alternating electromotive force, a first rectifier, a second rectifier, said rectifiers each being energized from said source and operative to impress a rectified unidirectional voltage between a positive output terminal and a negative output terminal, means connecting the cathode of said device to the negative terminal of said first rectifier, means connecting said control electrode of said device to the positive terminals of both of said rectifiers, means connecting the negative terminal of said second rectifier to the reflector electrode of said device, and means to vary the output voltage of said second rectifier in accordance with deviation of the operating frequency of said oscillator from a desired value, said last means varying said output voltage in a direction tending to cause said oscillator to operate at said desired value.

4. A regulating circuit comprising in combination, a source of alternating electromotive force, a first condenser, and a first electron discharge device connected in series relation across said source, said device having a cathode, an anode, and a control electrode, a rectifier and a second condenser connected in series connection across said device, said rectifier being disposed to conduct current from the common point of connection with said device in a direction opposite to said device, a utilization circuit, said circuit having an operating conditon varying in accordance with an applied voltage, means connecting said circuit across said second condenser thereby to supply said voltage, and means to vary the potential of the control electrode of said device with respect to the cathode thereof in accordance with the deviation of said operating condition from a desired value, said last means increasing the negative potential of said electrode as said load condition deviates from said predetermined value in the direction caused by increasing the value of said applied voltage.

5. In combination, a source of alternating electromotive force, a condenser, means to charge said condenser from said source when the electromotive force of said source is in one direction, a second condenser, means to charge said second condenser from the combined voltage of said source and said first condenser, said last means charging said second condenser when the electromotive force of said source is of direction opposite to said first direction, a load having an operating condition varying with an applied electromotive force, means connecting said load to said second condenser thereby to supply said electromotive force, and means responsive to deviation of said operating condition from a predetermined value to vary the magnitude of charge on said first condenser, said last means decreasing said charge as said load condition varies in the direction associated with increased voltage at said second condenser.

6. In combination, an electron discharge device having a first electrode, a second electrode, and a third electrode, and operating in an undesired manner when said third electrode becomes positive with respect to said first electrode, a first rectifier and a second rectifier, means to supply alternating voltage to said rectifiers, means connecting said first rectifier to make said first electrode negative with respect to said second electrode and connecting said second rectifier to make said third electrode negative with respect to said second electrode, thus to supply normal operating potential to said device, a capacitor connected between said second electrode and said third electrode, and a resistance connecting said first electrode and said third electrode, thus to prevent said third electrode from becoming substantially positive with respect to said first electrode under any voltage conditions at said second rectifier.

MICHAEL E. HIEHLE.

REFERENCES CITED

The following references are of record in the file of this patent:

UNITED STATES PATENTS

| Number | Name | Date |
| --- | --- | --- |
| 2,095,742 | Haller | Oct. 12, 1937 |
| 2,113,220 | Power | Apr. 5, 1938 |
| 2,406,850 | Pierce | Sept. 3, 1946 |